Patented Nov. 8, 1949

2,487,054

UNITED STATES PATENT OFFICE 2,487,054

PROCESS FOR THE HYDROGENATION OF FURFURAL

Benjamin Wilson Howk, Wilmington, Del., assignor to E. I. du Pont de Nemours & Company, Wilmington, Del., a corporation of Delaware No Drawing. Application April 23, 1946, Serial No. 664,439

6 Claims. (Cl. 260—345)

This invention relates to the art of hydrogenating furfural and more particularly to its hydrogenation employing a ruthenium catalyst.

The hydrogenation of furfural and examination of its reduction products have been the subject of considerable investigation. In general the prior art shows that a large number of compounds, e. g. furfuryl alcohol, sylvane, tetrahydrofurfuryl alcohol, tetrahydrosylvane, normal amyl alcohol, secondary amyl alcohol, pentanediol-1,2 and pentanediol-1,5 can be obtained from the hydrogenation, and the nature and amount of the compounds actually obtained depends, to a great extent, on the catalyst used. Catalysts containing copper yield primarily furfuryl alcohol or sylvane (alpha-methylfurane) without hydrogenation of the furane nucleus. Nickel catalysts effect the hydrogenation of pure furfuryl alcohol to tetrahydrofurfuryl alcohol in high yield, but attempts to use it for the one-step hydrogenation of furfural to tetrahydrofurfuryl alcohol have given poor results. Apparently, furfural poisons the nickel catalyst to such an extent that hydrogen absorption is slow and incomplete and a mixture of products containing only small amounts of tetrahydrofurfuryl alcohol results.

A few attempts have been made to employ noble metals as catalysts for the hydrogenation of furfural. The process using palladium catalysts requires 285 hours and 10 additions of fresh catalyst (Ber. 53, 1656 (1920)). With platinum catalysts the reduction stops at the furfuryl alcohol state unless the catalyst is reactivated several times by shaking with oxygen. Complete hydrogenation gives more by-products than tetrahydrofurfuryl alcohol (J. Am. Chem. Soc., 45, 3029 (1923); Ibid. 51, 3388 (1929)). Osmium on asbestos converts furfural primarily to sylvane.

As a result of the deficiencies of the known catalysts for the direct conversion of furfural to tetrahydrofurfuryl alcohol, in commercial practice the conversion is effected in two steps, namely, the hydrogenation of the furfural to furfuryl alcohol over copper chromite followed by hydrogenation of the purified furfuryl alcohol to tetrahydrofurfuryl alcohol over nickel catalysts. It is obviously desirable to employ a one-stage process wherein tetrahydrofurfuryl alcohol would be obtained from furfural without any intermediate isolation of furfuryl alcohol.

This invention has as an object a catalytic method for effecting the conversion of furfural to tetrahydrofurfuryl alcohol in one step. Another object is to provide a catalytic process whereby furfural is selectively hydrogenated to tetrahydrofurfuryl alcohol in one step in high yield. Other objects will appear hereinafter.

These objects are accomplished by the following invention wherein furfural is subjected to the action of hydrogen in the presence of a ruthenium catalyst.

In a preferred embodiment of the invention a reactor is charged with furfural and an equal weight of ethanol. To this charge is added about 3% by weight, based on the furfural, of a finely divided ruthenium catalyst. The reactor is closed, placed on an agitating rack and pressured with hydrogen to about 150 atm. and heated to about 100° C. After hydrogen absorption has ceased, the autoclave is cooled, opened, the contents discharged and filtered to remove the catalyst. The reaction product is separated from the ethanol by distillation or by other means known to the art.

The following example is included for purposes of illustration and not in limitation on the invention. Parts are by weight unless otherwise stated.

*Example*

A mixture of 72 parts of freshly distilled furfural, 75 parts of ethanol, 0.5 part of magnesium oxide, and 2.5 parts of a finely divided ruthenium dioxide catalyst was placed in an autoclave equipped for stirring and heated to 110° C. under 150 atm. pressure of hydrogen. At this temperature hydrogen absorption was rapid and ceased at the theoretical amount required for complete conversion of the furfural to tetrahydrofurfuryl alcohol. The autoclave was cooled, the contents discharged, and filtered to remove the catalyst. Upon fractional distillation of the filtrate, after removal of the alcohol, 56 parts of tetrahydrofurfuryl alcohol was collected at 64–66° C. at 15 mm. pressure. Successive cuts of this distillate showed no change of refractive index ($N_D^{24°C}$—1.4516) as the distillation proceeded. Tests of the product with aniline acetate failed to detect any unchanged furfural.

Although in the above example there have been used certain conditions of temperature and pressure, concentration, duration of reaction, etc. it is to be understood that these values may be varied somewhat within the scope of the invention. In general, the process of this invention is operable at temperatures ranging from 50° to 300° C. Generally, however, the process is operated at temperatures in the range of 100° to 150° C. since, under these conditions, the reaction takes place at a practicable rate with the production of the desired tetrahydrofurfuryl alcohol in maximum yield.

The hydrogenation is carried out at pressures in excess of atmospheric. For best results pressures which are in excess of 100 lb./sq. in. and generally in excess of 1000 lb/sq. in. are used since under such conditions satisfactory reaction rates are obtained. The upper pressure limit, however, is determined by the structural limitations of the equipment employed.

The process may be carried out in the absence of a solvent but it is generally operated in the presence of an inert organic solvent such as an alcohol, ether, or hydrocarbon. Examples of specific operable organic solvents are methanol, ethanol, propanol, isopropanol, dioxane, cyclohexane, etc.

The amount of catalyst used depends on whether reaction is to be operated at a low temperature or whether catalyst economy is desired. In general, the amount of catalyst used is that needed to bring about reaction at a suitable rate under the temperature and pressure conditions employed. Usually, the amount will vary from about 0.01 to 10% by weight of the furfural.

The catalysts of this invention comprise finely divided ruthenium, either in the form of the free metal or in the form of an oxide or salt. It has been found that a commercial grade of ruthenium oxide is satisfactory. The catalysts may also be supported on a carrier such as charcoal, silica gel, alumina, etc. A suitable method for preparing the charcoal-supported catalyst consists in treating ruthenium or its oxide with sodium peroxide, dissolving the salt, pouring the resulting solution on charcoal and drying the impregnated charcoal. Other methods, however, can be used such as that of U. S. 2,079,404 or other procedures based on the reduction of a compound of ruthenium in the presence of a carrier substance. Other forms of ruthenium which are effective as catalysts, in addition to elementary ruthenium and ruthenium oxides, e. g., ruthenium sesquioxide, dioxide, and tetraoxide, include the perruthenites, e. g., barium perruthenite; ruthenates, e. g., potassium, sodium, silver, barium, strontium, calcium, and magnesium ruthenates; perruthenates e. g., potassium and sodium perruthenates; ruthenium halides, e. g., ruthenium pentafluoride and ruthenium dichloride, trichloride, and tetrachloride; ruthenium chloro salts, e. g., potassium chloroperruthenates; ruthenium sulfides, e. g., ruthenium disulfide and trisulfide; ruthenium sulfate, and the like.

As previously indicated the amount of ruthenium catalyst used may vary from 0.01 to 10% by weight of the furfural. The exact percentages employed are dependent upon whether the reaction is to be effected at low temperatures or whether catalyst economy is desired. For relatively low temperature operation, e. g., at a temperature within the range of from 50°–125° C. it is desirable to use an amount of catalyst within the range of 1–5% by weight of the furfural. However, at higher temperatures substantial reduction of the furfural is had most economically when as little as 0.01% of catalyst is employed. As the amount of catalyst decreases, the temperature required to obtain a practical rate of reaction increases. Maximum rates are obtained most economically at temperatures of at least 50° C. through the employment of an amount of catalyst within the range of 0.5 to 3% by weight of the furfural.

The process of this invention may be effected as a liquid or vapor phase operation. It may also be operated as a batch, semi-continuous, or continuous operation.

Although the process is most useful in the preparation of tetrahydrofurfuryl alcohol from furfural it may also be employed for the conversion of alkyl substituted furfurals preferably of from one to five carbons in the alkyl group or groups.

Examples of suitable alkyl substituted furfurals are the methylfurfurals, 3,4-dimethylfurfural, 5-ethylfurfural, 4-isopropylfurfural, 5-amylfurfural, etc.

This invention provides a simple and one-step method for converting furfural to tetrahydrofurfuryl alcohol, a compound possessing valuable properties from an industrial standpoint. The invention also renders available a one-step method for the preparation of alkyl tetrahydrofurfuryl alcohols which may be employed as intermediates in the preparation of other compounds.

The foregoing detailed description has been given for clearness of understanding only and no unnecessary limitations are to be understood therefrom. The invention is not limited to the exact details shown and described for obvious modifications will occur to those skilled in the art.

What is claimed is:

1. Process which comprises bringing hydrogen, at 50–300° C. and at a pressure of at least 100 lbs. per square inch, in contact with furfural in the presence of a ruthenium catalyst and isolating tetrahydrofurfuryl alcohol from the reaction mixture.

2. Process which comprises bringing hydrogen, at 100–150° C. and at a pressure of at least 1000 lbs. per square inch, in contact with furfural in the presence of a ruthenium catalyst and isolating tetrahydrofurfuryl alcohol from the reaction mixture.

3. Process for the hydrogenation of furfural to tetrahydrofurfuryl alcohol which comprises bringing furfural in contact with hydrogen at superatmospheric pressure and at 50–300° C. in the presence of a ruthenium dioxide catalyst.

4. Process for the preparation, from furfural, of tetrahydrofurfuryl alcohol which comprises subjecting furfural, dissolved in an inert organic solvent therefor, to the action of hydrogen at 50–300° C. and at superatmospheric pressure and in the presence of a ruthenium dioxide catalyst.

5. Process for the preparation of an alkyl tetrahydrofurfuryl alcohol from the corresponding alkyl furfural which comprises subjecting the latter to the action of hydrogen at 50–300° C. and a pressure in excess of atmospheric in the presence of a ruthenium catalyst.

6. Process of claim 5 wherein the alkyl furfural is dissolved in an inert organic solvent and the catalyst is a ruthenium dioxide catalyst.

BENJAMIN WILSON HOWK.

REFERENCES CITED

The following references are of record in the file of this patent:

UNITED STATES PATENTS

| Number | Name | Date |
| --- | --- | --- |
| 2,095,548 | Hasselstrom | Oct. 12, 1937 |
| 2,232,917 | Hill | Feb. 25, 1941 |

OTHER REFERENCES

The Chemical Age, volume LVI, Number 1438, January 18, 1947, pages 115, 123, and 124.

Chem. Ab., 1943, volume 38, page 949$^8$.

Chem. Ab., 1942, volume 36, page 1943$^7$.